(12) United States Patent
Jain et al.

(10) Patent No.: US 8,351,454 B2
(45) Date of Patent: Jan. 8, 2013

(54) SECURITY SYSTEM AND METHOD FOR WIRELESS COMMUNICATION WITHIN A VEHICLE

(75) Inventors: Vivek Jain, Mountain View, CA (US); Thomas Alfons Hogenmueller, Sunnyvale, CA (US)

(73) Assignee: Robert Bosch GmbH, Stuttgart (DE)

( * ) Notice: Subject to any disclaimer, the term of this patent is extended or adjusted under 35 U.S.C. 154(b) by 689 days.

(21) Appl. No.: 12/469,068

(22) Filed: May 20, 2009

(65) Prior Publication Data

US 2010/0296387 A1 Nov. 25, 2010

(51) Int. Cl.
*H04L 12/28* (2006.01)

(52) U.S. Cl. ......................... 370/431; 370/280

(58) Field of Classification Search ............... 370/280, 370/281, 294, 295, 329, 341, 431; 455/450, 455/464, 509
See application file for complete search history.

(56) References Cited

U.S. PATENT DOCUMENTS

| | | | |
|---|---|---|---|
| 6,426,814 B1* | 7/2002 | Berger et al. | 398/45 |
| 2004/0165559 A1* | 8/2004 | Kwak et al. | 370/335 |
| 2005/0152293 A1* | 7/2005 | Nanda et al. | 370/310 |
| 2005/0181833 A1* | 8/2005 | Lee et al. | 455/562.1 |
| 2006/0072501 A1* | 4/2006 | Toshimitsu et al. | 370/328 |
| 2008/0008137 A1* | 1/2008 | Robinson | 370/338 |
| 2008/0148409 A1 | 6/2008 | Ampunan et al. | |
| 2009/0005938 A1 | 1/2009 | Phipps et al. | |

FOREIGN PATENT DOCUMENTS

| | | |
|---|---|---|
| EP | 1 653 658 A2 | 3/2006 |
| WO | WO 2006067271 A1 | 6/2006 |
| WO | WO 2008060082 A1 | 5/2008 |

\* cited by examiner

*Primary Examiner* — Mark Rinehart
*Assistant Examiner* — Mang Yeung

(57) ABSTRACT

A method for providing wireless communications between nodes of a vehicle includes providing a plurality of frequency channels on which the nodes of a first vehicle may wirelessly communicate. Wireless communication with a second vehicle adjacent to the first vehicle includes assigning a first of the frequency channels to the first vehicle for intra-vehicle transmissions within the first vehicle, and a second of the frequency channels to the second vehicle for intra-vehicle transmissions within the second vehicle. The first vehicle is prohibited from using the second frequency channel and the second vehicle is prohibited from using the first frequency channel.

19 Claims, 8 Drawing Sheets

400

SECURITY SYSTEM AND METHOD FOR WIRELESS COMMUNICATION WITHIN A VEHICLE

COPYRIGHT NOTICE

Portions of this document are subject to copyright protection. The copyright owner does not object to facsimile reproduction of the patent document as it is made available by the U.S. Patent and Trademark Office. However, the copyright owner reserves all copyrights in the software described herein and shown in the drawings. The following notice applies to the software described and illustrated herein: Copyright© 2009, Robert Bosch GmbH, All Rights Reserved.

BACKGROUND

1. Field of the Invention

The present invention relates to a method for wireless communication, and, more particularly, to a method for wireless communication with increased security and robustness within a vehicle.

2. Description of the Related Art

It is known for wireless communication to be employed between and within various systems within a vehicle, such as an automobile. Wireless intra-vehicular networks involve transmitting sensor data to central nodes and commanding data from a controlling node to the actuators over the wireless channel.

A problem with such wireless systems is that they are subject to malicious wireless attacks from parties disposed outside the vehicle. Such wireless intra-vehicular networks pose serious security challenges if not designed properly, as in the worst case the system can be hacked and hence be controlled wirelessly from a distance. A malicious attack may result in signals being sent to a seat actuator to cause a seat to move, or to a rearview mirror actuator to cause a rearview mirror to move, for example. Such sudden movements of a seat or a mirror could contribute to the driver losing control of the vehicle or becoming unaware of his surroundings. Either of these scenarios could result in the vehicle being involved in a collision. As an example, when a vehicle is traveling at high speed and the driver's seat suddenly moves forward/backward it can catch the driver off guard.

In addition to actuation signals being maliciously counterfeited or manipulated, data used or produced by sensors or actuators can be maliciously counterfeited or manipulated for active attacks. Such corrupted data may also cause electronics or actuators to operate unpredictably.

Another problem with such wireless systems is that faults or abnormalities that occur within the individual nodes may be difficult to detect and neutralize. For example, it may be difficult to determine whether a signal from a node is legitimate or due to a malfunction of the nodes. Even if it is recognized that a signal is being sent from a malfunctioning node, it may still be difficult to identify which node the signal is being transmitted from, or whether the signal is being sent from an external node that is outside of the wireless system.

It is known for encryption and authentication algorithms to be employed in increasing the security of a system. However, a tradeoff exists due to the complexity in implementing the security scheme. That is, some schemes are computationally intensive and hence can increase the message latency, which may be undesirable for many applications. Some schemes can be implemented in hardware, which results in additional components and hence additional cost and space requirements. For these reasons, the choice of security scheme may be application dependent. Similarly, there are several techniques developed for intrusion detection that enable the nodes to detect when the system has been compromised and hence can detect a security threat.

What is neither disclosed nor suggested in the art is a system and method for wireless network communication that is capable of thwarting malicious wireless attacks as well as detecting abnormalities occurring due to faulty nodes or faulty channels. More generally, what is neither disclosed nor suggested in the art is a system and method for wireless network communication that achieves a level of safety and security that is appropriate for vehicular applications.

SUMMARY OF THE INVENTION

The present invention provides a wireless network communication system and method with increased security and robustness. More particularly, the invention may provide systems and methods for detecting abnormalities occurring due to faulty nodes, faulty communication channels, and/or malicious wireless attacks conducted by another party. In the event that such abnormalities and/or attacks do occur, the invention may provide a system and method for enabling the vehicle to "limp home" as safely as possible and still be operated in worst case scenarios.

The present invention provides a wireless network communication system that is robust in mitigating or minimizing the effects of the system's own internal failures; that is able to recognize and identify a malicious attack on the system; and that is robust in mitigating or minimizing the effects of a successful attack on the system.

The present invention may include and provide enhancements to a wireless communication security system such that the system is able to identify a malicious intrusion.

The invention comprises, in one form thereof, a method for providing wireless communications between nodes of a vehicle. A plurality of frequency channels are provided on which the nodes of a first vehicle may wirelessly communicate. Wireless communication with a second vehicle adjacent to the first vehicle includes assigning a first of the frequency channels to the first vehicle for intra-vehicle transmissions within the first vehicle, and a second of the frequency channels to the second vehicle for intra-vehicle transmissions within the second vehicle. The first vehicle is prohibited from using the second frequency channel and the second vehicle is prohibited from using the first frequency channel.

The invention comprises, in another form thereof, a method for operating a wirelessly controlled actuator within a vehicle. Wireless signals are transmitted to the actuator in the vehicle. The wireless signals cause a first part of the actuator to move relative to a second part of the actuator within a first range of motion. After the vehicle is in motion, the first part is provided with a limited range of motion relative to the second part. The providing of the limited range of motion is implemented via software. The limited range of motion is less than the first range of motion.

The invention comprises, in yet another form thereof, a method for reprogramming a node of a communication system. A signal is transmitted from a first node to a second node. The signal requests that the second node be reprogrammed. The signal includes an identification of the first node. The second node is used to broadcast the identification of the first node to other nodes in the communication system. The second node is reprogrammed only if a predetermined quantity of the other nodes confirm that the first node is legitimate based on the identification.

An advantage of the present invention is that many embodiments of the invention are equally applicable to wired networks and wireless networks.

Another advantage is that the invention may be applicable to automotive networks as well as to other applications. For example, the principles of the present invention may be applied to industrial networks, cargo, airplanes, ships, etc.

BRIEF DESCRIPTION OF THE DRAWINGS

The above mentioned and other features and objects of this invention, and the manner of attaining them, will become more apparent and the invention itself will be better understood by reference to the following description of an embodiment of the invention taken in conjunction with the accompanying drawings, wherein:

FIG. 5b is a schematic diagram of actuator arrangements that may be used in conjunction with the method of FIG. 5a.

Figure 1:
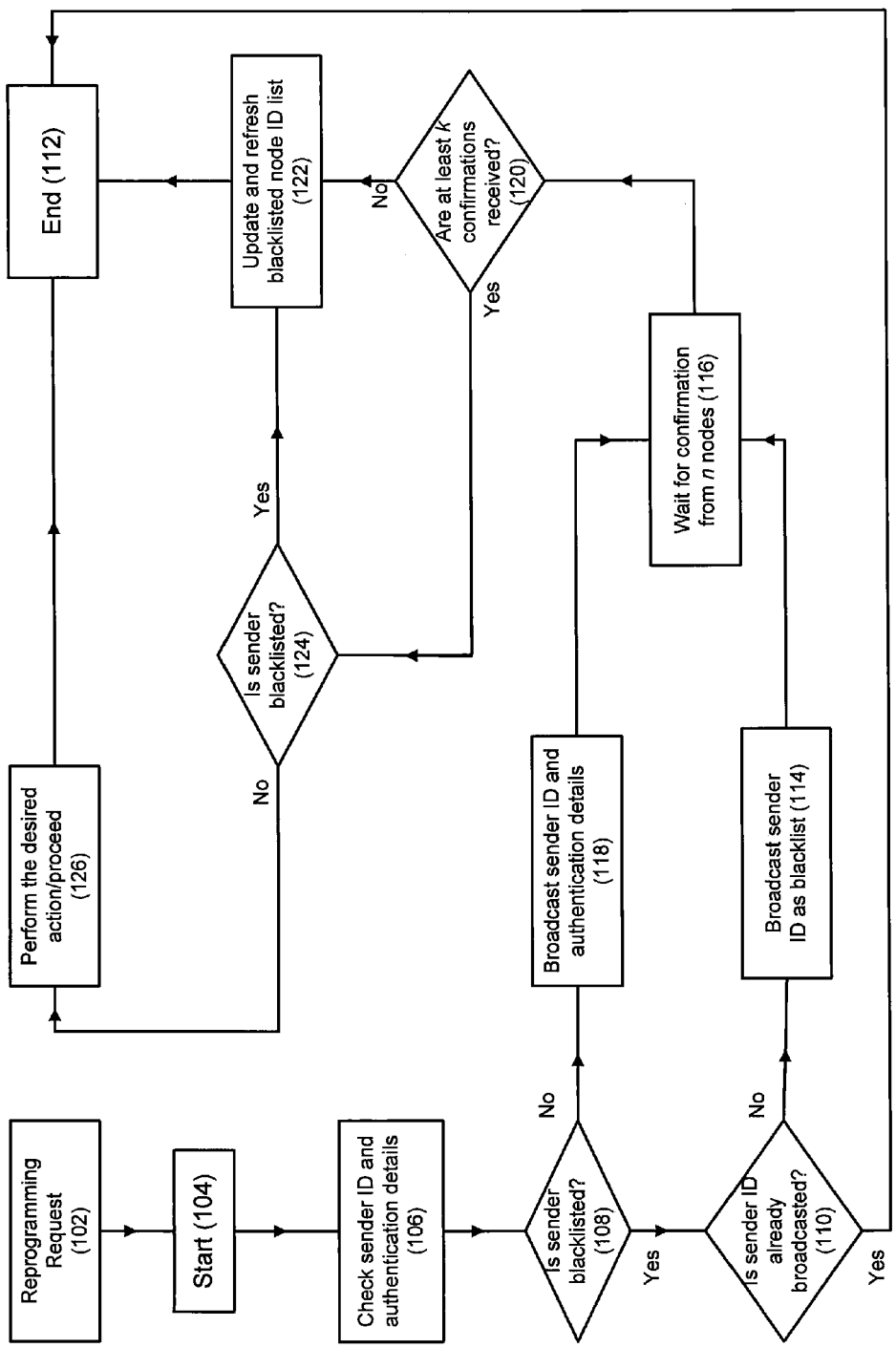
FIG. 1 is a flow chart of one embodiment of an authentication rule of the present invention for node programming.

Corresponding reference characters indicate corresponding parts throughout the several views. Although the drawings represent embodiments of the present invention, the drawings are not necessarily to scale and certain features may be exaggerated in order to better illustrate and explain the present invention. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

The embodiments hereinafter disclosed are not intended to be exhaustive or limit the invention to the precise forms disclosed in the following description. Rather the embodiments are chosen and described so that others skilled in the art may utilize its teachings.

The present invention may provide advanced features which increase the robustness of the overall system, including user-defined passwords; protected node flashing/reprogramming; boundary thresholds for actuators; moving averages/redundancy for wireless sensors; mitigating jamming effects; and manually accessible pushbuttons/switches.

1. Advanced Features that Increase the Robustness of the Overall System 1.1 User-Defined Passwords In one embodiment, each purchaser of a new vehicle selects a secret password or "key" which is then flashed or otherwise communicated to the nodes using on-air reprogramming or by any other communication method. For example, the main gateway node may be explicitly reprogrammed, or all nodes may be reprogrammed using power line communications, etc. The initial reprogramming of the nodes can be performed by universal code (make/model). However, once a vehicle is sold, the purchaser may also select his own secret password which may be then fed to the nodes. From that time onward, the nodes may be reprogrammed only when both the secret universal code and the user's secret password are entered. A user-defined password may add security to the system as the nodes virtually cannot be reprogrammed without knowing the user's password. The passwords may serve to identify all the wireless nodes in a vehicle as being included in that single automobile.

1.2 Protected Node Flashing/Reprogramming

The on-air/wireless reprogramming of nodes may be performed in a protected environment. In order to avoid a virus attack being launched into the system, the node may authenticate the source of the code/password. In order to perform such authentication, an authentication rule and/or a brute force algorithm may be adopted, as described below:

1.2.1 (n,k) Authentication Rule

According to one embodiment of an (n,k) authentication rule for node reprogramming, if a node is asked to reprogram, then the node broadcasts the information of the source of the request. In response to the broadcast, the node may require that least k out of a total of n nodes in the network authenticate the source and the timing of the update. In a first step 102 (FIG. 1) of a specific source authentication method 100 for node reprogramming, a reprogramming request is made and the authentication rule is started (step 104). The sender identification and authentication details are checked in step 106.

In a next step 108, it is determined whether the sender is blacklisted. If so, then it is determined in step 110 whether the sender identification has already been broadcasted. If the sender identification has already been broadcasted, then the reprogramming request may be ignored, and source authentication method 100 ends (step 112). However, if it is determined in step 110 that the sender identification has not already been broadcasted, then the sender identification is broadcast as being blacklisted (step 114). The system then may wait for confirmation from the n number of nodes (step 116).

If, however, it is determined in step 108 that the sender is not blacklisted, then in step 118 the sender's identification and authentication details are broadcast. Next, in step 116, the system may wait for confirmation from the n number of nodes.

After step 116, it is determined in step 120 whether confirmations have been received from at least k of the n nodes. If not, then in step 122 the list of identifications of blacklisted nodes is updated and refreshed, and source authentication method 100 ends (step 112).

If, however, it is determined in step 120 that confirmations have been received from at least k of the n nodes, then in step 124 it is determined whether the sender is blacklisted. If so, then operation proceeds to step 122 where the list of identifications of blacklisted nodes is updated and refreshed, and source authentication method 100 ends (step 112).

If, however, it is determined in step 124 that the sender is not blacklisted, then the reprogramming request proceeds and the desired action is performed. Lastly, source authentication method 100 ends (step 112).

If any of the information provided by the requesting source node is wrong, then the attacked node may halt the communication with the malicious node and may issue/sound an alarm. Next, all the nodes in the network may start ignoring any message from the malicious node until the whole network (i.e., all the wireless nodes in the vehicle) is switched "off." In one embodiment, all the wireless nodes in the vehicle stop accepting messages, and operate exclusively in a predetermined "attacked" mode. By the nodes not accepting messages, the effects of a Denial of Service (DoS) attack which the malicious node can launch may be mitigated. In a DoS attack, the malicious node can keep on transmitting password/code update requests with new identifications, which may lead the attacked node to transmit and collect acknowledgements for authentication requests. Thus, in order to avoid these authentication requests and other message exchanges, all the nodes in the network may ignore messages from the malicious node. This aspect of the invention may also be applicable to wired networks wherein a faulty or compromised node can keep on transmitting some random data, which may lead to data collisions on the channel or effectively jamming the wired channel. However, an advantage of a wireless network is that it provides several channels to operate on. Thus, if one channel is bad, then another channel may be switched to.

By broadcasting the information of both the source node and the destination node for reprogramming, the remainder of the nodes in the network may record the identifications for both of these nodes. Thus, if in the future the newly programmed destination node acts in an unexpected manner, then both the source node and the destination node may be blacklisted and may no longer be treated as part of the network.

1.2.2 Brute Force Algorithm

In a brute force algorithm, a node may be updated only after a combination of specific commands and a user-defined password/code is provided. In one embodiment, specialized equipment may be required to provide the specific commands, and thus the node update may typically be performed in a garage where such specialized equipment is available.

1.3 Boundary Thresholds for Actuators

In one embodiment, after the vehicle has been running for a short time (e.g., a few minutes after starting), certain actuators such as seat (responsible for forward/backward movement), mirror and other safety-related actuators are allowed to move only within certain threshold spatial boundaries. In such a case, when a car is in motion and an active attack is launched, the seats and mirrors are prevented from moving substantial distances and the driver is enabled to maintain control of the vehicle. These actuators are again allowed to freely move when the car is switched "off" and "on", i.e., a hard reboot. This is a safety feature equally applicable for both wired and wireless networks.

1.4 Moving Averages/Redundancy for Wireless Sensors

Sensor values may be used for display/warning purposes and for controlling the actuators. An active attack may lead to wrong sensor values on the network, which may either lead to unnecessary warning messages or unusual actuator behavior. Hence, certain methods may be based on sensor values. Some sensor values may not change sharply and thus any sudden change in the values may be discarded. As an alternative approach for the sensor values that may not change sharply, the system may use moving averages to change slowly from the original value to the new value.

For other sensors whose values may change sharply or vary widely, redundant sources of data may be provided in order to verify the data. For example, in the case of vehicle speed data received from a speedometer, nearly identical data may be obtained from a global positioning system (GPS), radar, and cameras, which may all be provided in the car. In the worst case wherein the data cannot be verified, any preventative measures which would normally result from the sensor values may not be activated. Again, this feature may be equally applicable to wired networks and wireless networks.

1.5 Mitigating Jamming Effects

Channel jamming can occur in two different forms. The first form is active channel jamming in which a malicious node or nodes jam all or some channels. The second form is passive jamming in which the channels are jammed due to a large number of wireless technologies using the same band in the vicinity. If at least one channel is available, then the whole network can switch to that channel, but the other networks in the neighborhood can also move to that free channel for better throughput. Hence, networks may coordinate among themselves to mitigate the effects of channel jamming. To enable the networks to coordinate among themselves, the following measures may be adopted.

1.5.1 Active Attack

If all channels are blocked, then central nodes may sound an alarm or flash an alarm message to alert the driver while all other nodes move/freeze to their default/predefined settings. In such case, the operation of actuators may be suspended while preference is given for sensor messages. Also, important systems such as blinkers/lights may turn "on," or turn to their safest mode of operation, so that the effects are minimal. Finally, "limp home" measures may be triggered to deal with the active attack scenario.

1.5.2 Passive Attack

Figure 2A:
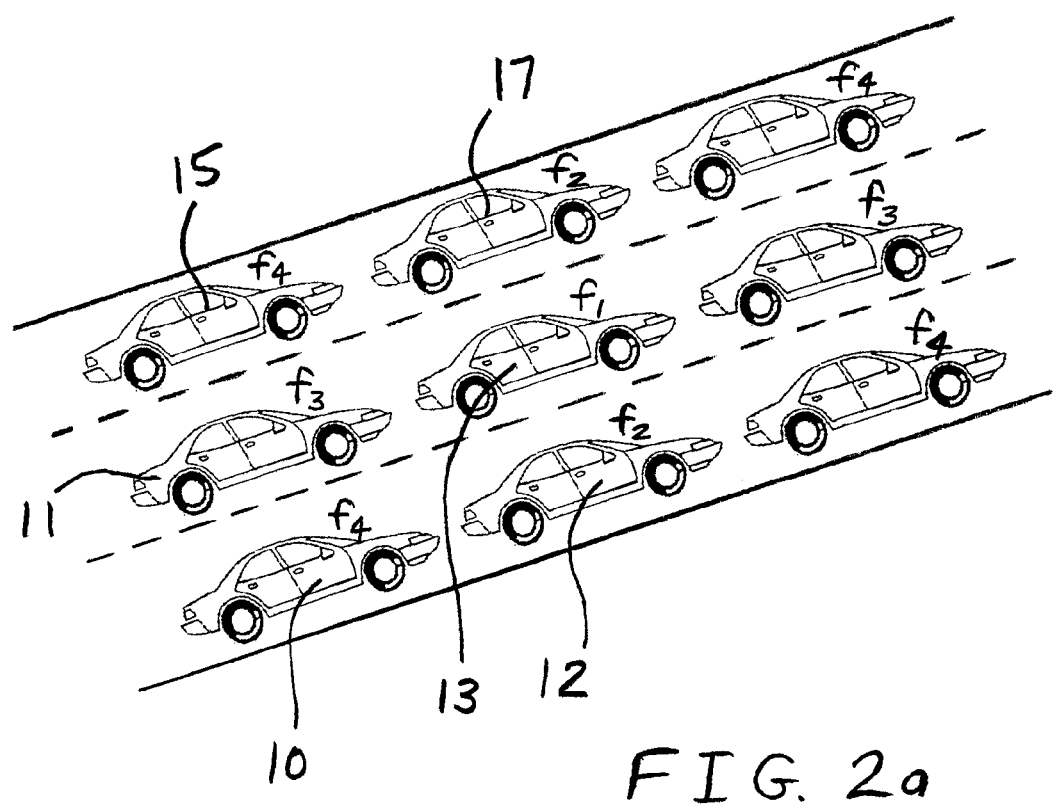
FIG. 2a is a diagram illustrating a number of frequency channels used for non-interfering performance on a road or parking lot according to one embodiment of the present invention.
Figure 2B:
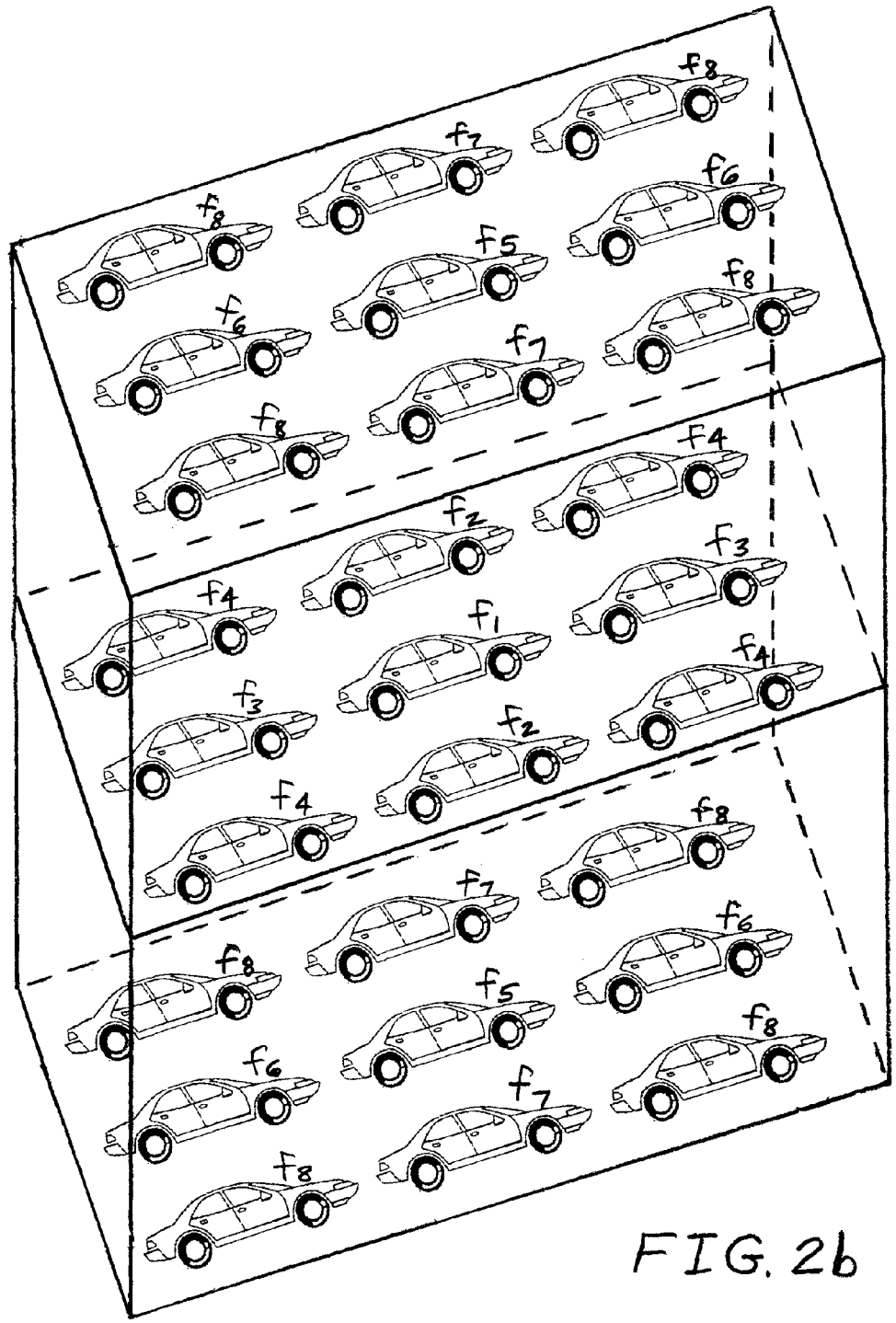
FIG. 2b is a diagram illustrating a number of frequency channels used for non-interfering performance in a parking garage according to one embodiment of the present invention.

A passive attack can result from nearby cars using the same frequency or a lot of wireless technologies within the car using the same frequency channel. In such cases, inter-car communication may be used for selecting the right frequency channels and power levels. In this scheme, the neighboring cars may communicate among themselves to select mutually exclusive channels. As illustrated in FIG. 2a, a minimum of four channels may be enough for non-interfering performance on the highway or other two-dimensional environment. That is, modeling the positions of the vehicles in a rectangular array of rows and columns as shown in FIG. 2a, the use of four channels allows the eight vehicles adjacent to, or diagonally adjacent to, a given vehicle to use a different frequency from that of the given vehicle. In a parking garage, however, with layers of vehicles disposed above and below a given vehicle as illustrated in FIG. 2b, a minimum of eight channels may be needed for non-interfering performance. That is, modeling the positions of the vehicles in a three-dimensional cubic array as shown in FIG. 2b, the use of eight channels allows the twenty-six vehicles adjacent to, or diagonally adjacent to, a given vehicle to use a different frequency from that of the given vehicle. However, not all cars in the parking lot are always "on" and the network load is also typically less while operating in a garage. Thus, it is possible that frequencies can be shared by vertically-adjacent, diagonally-adjacent and/or horizontally-adjacent vehicles. Moreover, if no free channel is available, then the cars may decide on a time-share schedule on the same channel.

In another embodiment, cars may use adaptive power control schemes so as to not interfere with two-hop neighbors. Adaptive power control may optimize the transmitted power of each transmitter to achieve a reduced or minimum energy per bit. Adaptive power control may allow for minimum interference to other receivers as well as maximum capacity of spectrum allocation. More generally communication between vehicles may enable the vehicles to agree upon assignments of maximum power levels that each vehicle may use for its intra-vehicle transmissions. The maximum power levels may be dependent upon a number of adjacent vehicles, the distances to the adjacent vehicles, and the magnitude of the differences between the frequencies used by the adjacent vehicles and the vehicle in question.

1.6 Manually Accessible Buttons/Switches

Certain wirelessly-controlled switches, such as door locks, may be manually accessible so that in the worst case the driver can manually actuate the switch. In the case of a door lock switch, the driver may then open the unlocked door and escape the vehicle even though the dock lock switch cannot be wirelessly controlled, such as may result from a car crash. As in many cars, the door may lock automatically a few minutes after the car is started and may unlock when the car is switched "off". The same mode of operation may apply to other switches and pushbuttons as well. This is a convenience feature that is equally applicable to both wired and wireless networks to mitigate the effects of failures due to faulty nodes.

2. Detecting Abnormalities

Abnormal functioning may result from a faulty node, a noisy channel, a security attack, or any combination of the above. The response to abnormal function may be either a bad response (e.g., poorly formed packet) or no response. A good response can occur from only a very intelligent security attack. Hence, it may be advantageous to detect each of these abnormalities so that appropriate measures may be taken.

2.1 Faulty Node Detection

Figure 3:
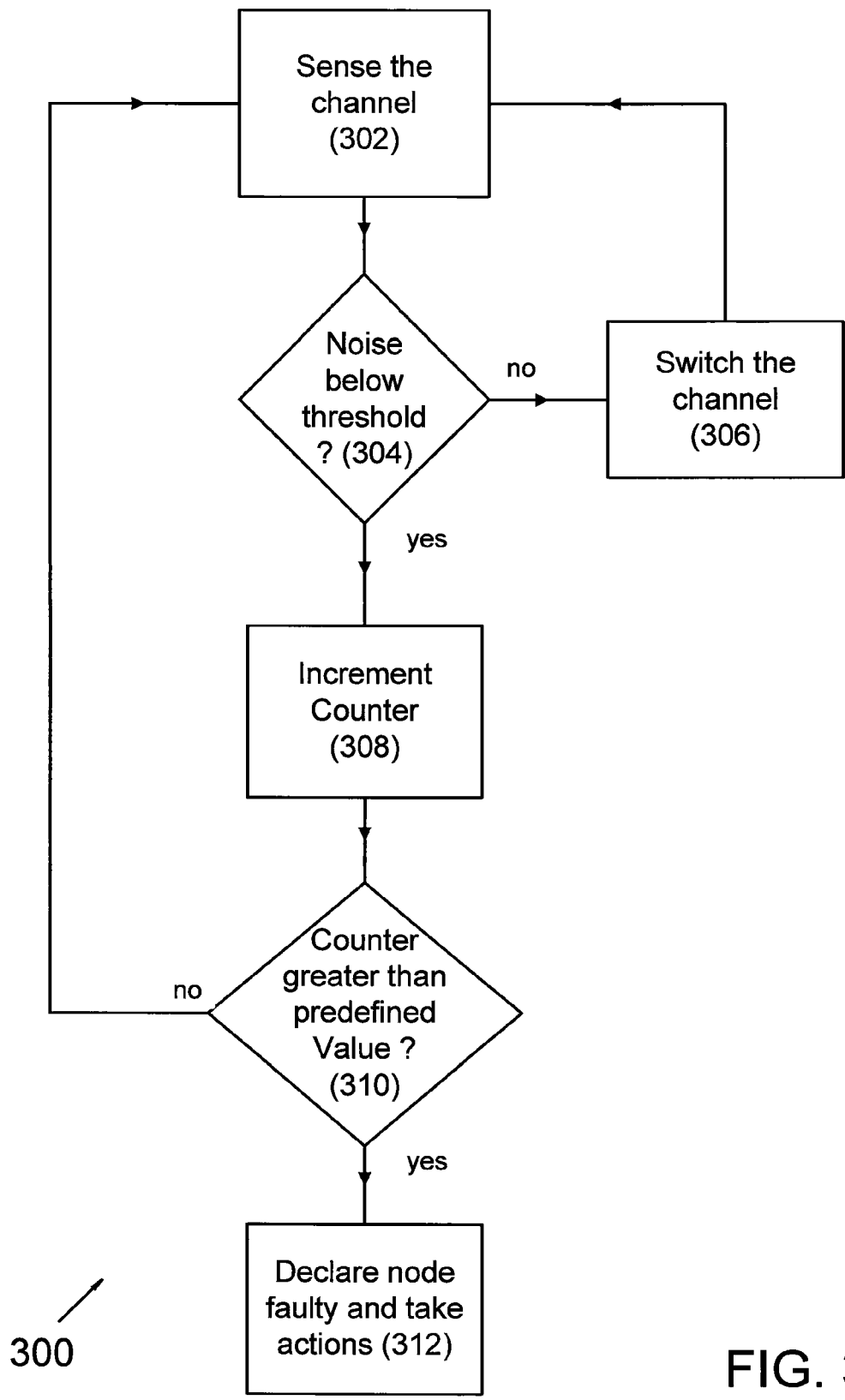
FIG. 3 is a flow chart of a faulty node detection method according to one embodiment of the present invention.

To affirm that the node is faulty, the following steps may be taken, as illustrated in FIG. 3 by method 300:

1. Sense the channel (step 302). For example, the signal-to-noise ration on the channel may be determined by conventional techniques. If the channel is not free (e.g., the noise is not below a desired threshold), as determined in step 304, then a switch is made to another channel (step 306) and the process begins again at step 302. If, however, it is determined in step 304 that the channel is free, then the counter is increased (step 308). Next, it is determined in step 310 whether the counter is greater than a pre-determined value. If so, then the node is declared as faulty and actions may be taken to mitigate the effects of the faulty node. Else, if the counter is not greater than a pre-determined value, then operation returns to channel 302 to confirm that the node is faulty. The noise level of the channel may be checked as many times as deemed necessary before the node may be declared faulty.

2.2 Noisy Channel Detection

In order to detect a noisy channel, the channel and the quality of the signal thereon may be sensed. If the channel is noisy, then the system may switch to another, predefined channel. The process may continue until a good channel with a low level of noise is discovered. If no such low-noise channel is found, then the methods described hereinabove in section 1.5.2 entitled "Passive attack" may be implemented. If a good quality channel still cannot be found, then the methods described hereinbelow in section 3 entitled "'Limp Home' Procedures for Worst Case" may be carried out.

With a wired channel, if the wire is faulty, then the whole network is non-operational. With a wireless channel, in contrast, if the channel is bad, then the system may advantageously simply switch to another channel and the network remains operational.

2.3 Security Attack or Intrusion Detection

In case the response to a security attack is bad, or if there is no response at all, then the above-described methods may still be effective in mitigating the effects of the security attack. However, if the attack is an intelligent one in which an intruder behaves like a part of the network, then an intruder node may try to either send wrong sensor data or send wrong commands to the actuators. However, sending wrong sensor data may not be possible because the malicious node would have to transmit the data in the expected slots, which would cause collisions with the genuine sensor data that is also being transmitted. In such a case, the methods described above in section 2.1 entitled "Faulty Node Detection" may be implemented. One possible way for the malicious node to successfully launch an attack by sending wrong sensor data is to disable the genuine node and then enter the network as a replacement node. Depending upon the architecture of the system, if such an attack is possible, then the driver may detect the abnormal operation of the system, as is the case for traditional wired networks when sensors malfunction.

If a malicious attack is in the form of sending wrong commands to the actuators, then the methods described above in section 1.3 and 1.4, entitled "Boundary Thresholds for Actuators" and "Moving Averages/Redundancy for Wireless Sensors", respectively, may be implemented to mitigate the harmful effects of the malicious attack. However, with a good security scheme in place, launching such attacks is very difficult. Hence, the typical scenarios may include only a faulty node or a noisy channel.

3. "Limp Home" Procedures for Worst Case

The worst case scenario occurs when the attacker behaves as if it is a part of the system by successfully launching a virus attack on the nodes in the network or by jamming all channels. In such a scenario, in addition to known limp home procedures provided in a wired network, the following two methods may also be implemented. First, in case all frequency channels are jammed, then default/predefined procedures may be provided for each sensor/actuator or sub-network. For example, a default/predefined procedure may include switching "on" the blinkers and/or front/rear lights; defrosters may be turned on as well as associated fans; and cruise-control may be turned off. As another example, alarms may be activated. Generally, each node may be set to operate in its safest mode. Only the sensors that are most important for safety or operation of the vehicle may continue to transmit the data values that they sense. Further, if the jamming continues for a predetermined length of time, then a call to a security agency, such as the local police or the Federal Communications Commission (FCC) may be automatically placed. The call may communicate the occurrence of the jamming along with the current global coordinates (e.g., GPS location) and the current planned route of the vehicle. Such jamming is generally not possible unless done intentionally and explicitly, which is a non-trivial task and may be a criminal offense.

A second method that may be implemented in response to an intelligent attack in which data is sent to an actuator includes providing verifying data from at least a second source. The nodes receiving data from critical sensors may occasionally receive redundant and nearly identical information or data from alternate sources, as discussed above with regard to intelligent security attacks in section 1.4 entitled "Moving Averages/Redundancy for Wireless Sensors". In the event that a large discrepancy is detected between the data from the two or more sources, the driver is alerted and/or appropriate action is taken. For example, the driver may be informed of the particular sensor whose data is not consistent with the data from other sensors. In the case of only two sensors whose data do not agree, the driver may be informed of the identities of both of the sensors. The appropriate action that is taken may include ignoring data from the particular sensor whose data is not consistent with the data from other sensors. In the case of only two sensors whose data do not agree, the data from both sensors may be ignored. Alternatively, the data from one of the two sensors that differs more from expected values of the data may be ignored. Expected values of the data may be based on historical data, which may be adjusted to reflect current conditions via regression analysis.

Figure 4:
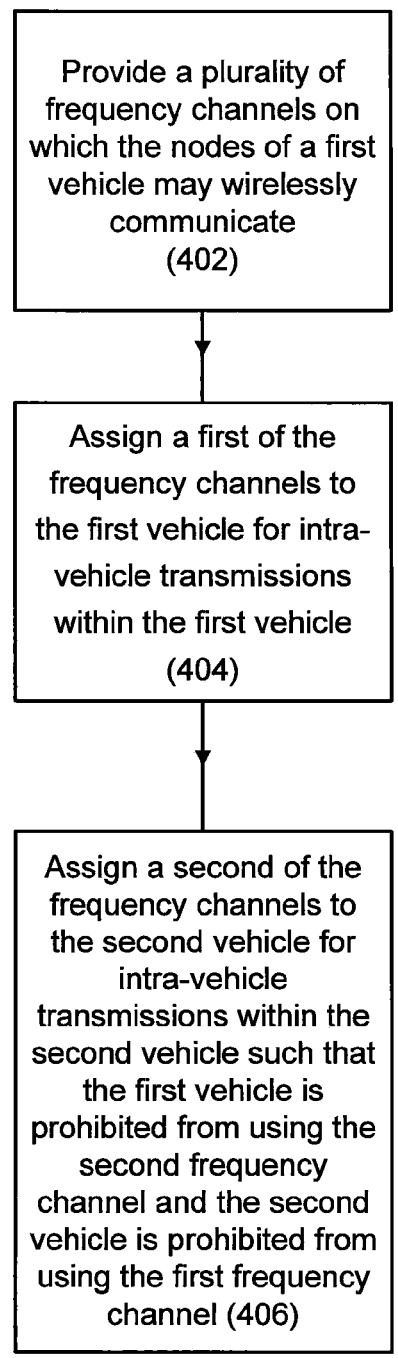
FIG. 4 is a flow chart of a method for providing wireless communications between nodes of a vehicle according to one embodiment of the present invention.

One embodiment of a method 400 for providing wireless communications between nodes of a vehicle is illustrated in FIG. 4. In a first step 402, a plurality of frequency channels are provided on which the nodes of a first vehicle may wirelessly communicate. For example, in the embodiment of FIG. 2a, frequency channels $f_1$, $f_2$, $f_3$, $f_4$ may be provided on which the nodes of a vehicle 10 may wirelessly communicate with each other.

In a next step 404, a first of the frequency channels is assigned to the first vehicle for intra-vehicle transmissions within the first vehicle. That is, vehicle 10 may wirelessly communicate with vehicle 12 which is adjacent to vehicle 10. The communications may include assigning frequency channel $f_4$ to vehicle 10 for intra-vehicle transmissions within vehicle 10.

In a final step 406, a second of the frequency channels is assigned to the second vehicle for intra-vehicle transmissions within the second vehicle such that the first vehicle is prohibited from using the second frequency channel and the second vehicle is prohibited from using the first frequency channel. For example, the communications between vehicle 10 and vehicle 12 may include assigning frequency channel $f_2$ to vehicle 12 for intra-vehicle transmissions within vehicle 12. The communications may include an agreement prohibiting vehicle 10 from using channel $f_2$ for intra-vehicle transmissions, and prohibiting vehicle 12 from using channel $f_4$ for intra-vehicle transmissions. These prohibitions may be in effect at least at certain times.

Vehicles 11 and 13 may move into position adjacent to both vehicles 10 and 12. After becoming adjacent, and thereby coming within transmission range of vehicles 10 and 12, vehicles 11 and 13 may join in the communication. The communication between vehicles 10-13 may result in vehicles 11 and 13 being assigned channels f3 and f1, respectively, for intra-vehicle transmissions between network nodes.

With vehicles 10-13 being mutually adjacent to each other, a fifth vehicle 15 may travel into position adjacent to, i.e., within communication range of, vehicles 11 and 13, as shown in FIG. 2a. After entering into communication with vehicles 11 and 13, vehicle 15 may come into agreement with vehicles 11 and 13 to adopt channel $f_2$ or channel $f_4$ for intra-vehicle transmissions within vehicle 15. In one embodiment, vehicle 15 may be assigned the channel of whichever of vehicles 10 and 12 that vehicle 15 is closer to at the time. As shown in FIG. 2a, vehicle 15 may be closer to its two-hop neighbor vehicle 10, and thus may use the same channel as vehicle 10, i.e., channel $f_4$. Thus, if a sixth vehicle such as vehicle 17 enters the position shown in FIG. 2a adjacent to vehicles 11, 13 and 15, then vehicle 17 may communicate with vehicles 11, 13 and 15 and thereby be assigned channel $f_2$, i.e., the same channel as vehicle 12.

Of course, as vehicles travel and change positions relative to each other, it may become advantageous to reassign channels amongst the vehicles. In one embodiment, channels are reassigned as soon as a vehicle changes position relative to other vehicles within the parameters of the rectangular model of rows and columns of vehicles. In another embodiment, however, channels are reassigned after actual inter-vehicle interference is sensed.

As may be evident from FIGS. 2a and 2b as well as from the above descriptions, assigning channels in an interleaved fashion may prevent interference while at the same time occupying a minimal number of frequency channels. Particularly, each channel may be assigned to alternating vehicles in a given lane, and only to those vehicles in alternating lanes, as shown in FIG. 2a. Further, in the three-dimensional parking garage scenario depicted in FIG. 2b, the pattern of channel assignments shown in FIG. 2a may be repeated in alternating floors of the parking garage.

Figure 5A:
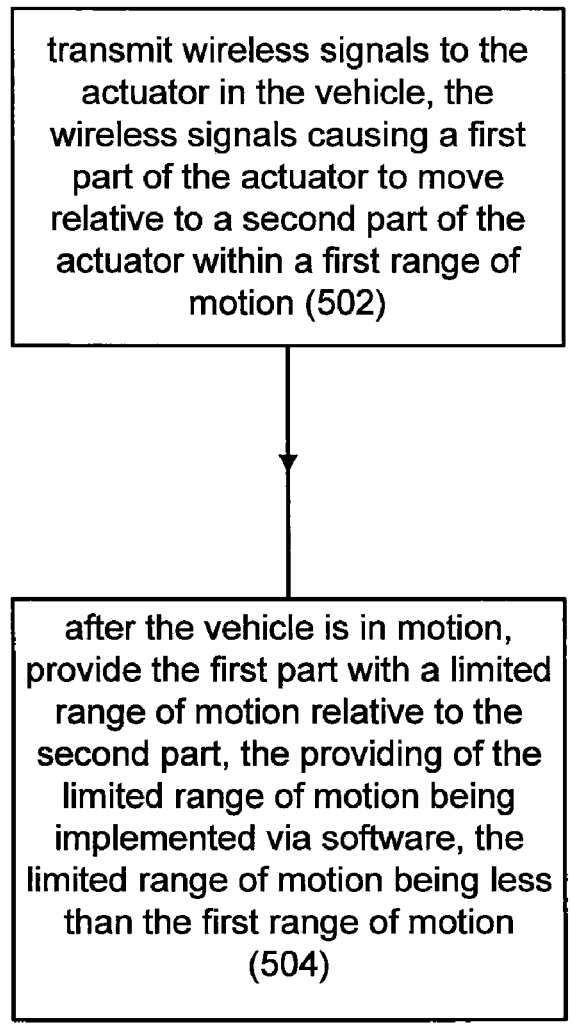
FIG. 5a is a flow chart of a method for operating wirelessly controlled actuators within a vehicle according to one embodiment of the present invention.
Figure 5B:
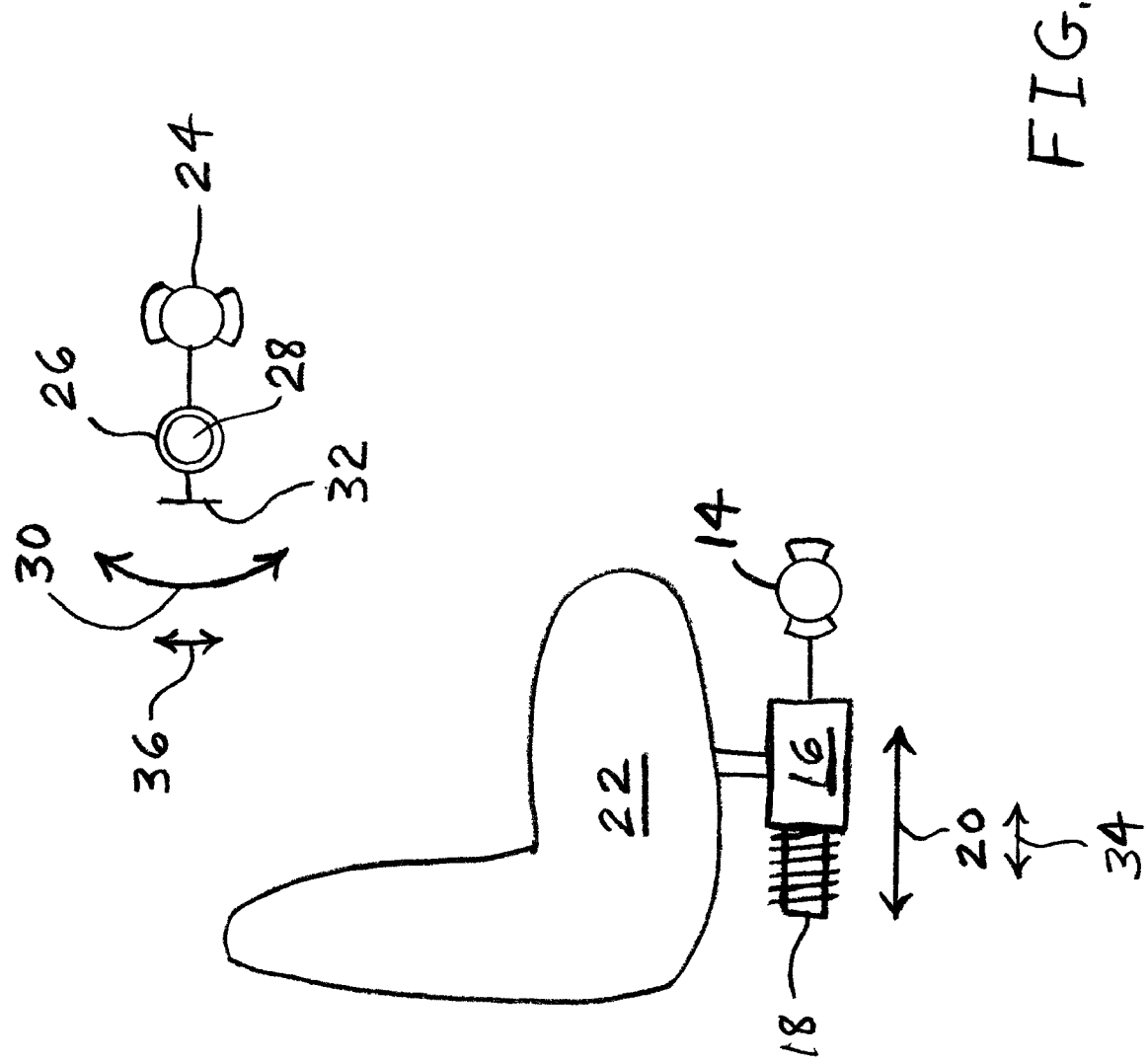

One embodiment of a method 500 for operating wirelessly controlled actuators within a vehicle is illustrated in FIG. 5a. In a first step 502, wireless signals are transmitted to the actuator in the vehicle, the wireless signals causing a first part of the actuator to move relative to a second part of the actuator within a first range of motion. For example, as illustrated in FIG. 5b, wireless signals may be transmitted to a vehicle seat actuator having a motor 14. The wireless signals may cause a first internally-threaded part 16 of the actuator to rotate and thereby move relative to an externally-threaded second part 18 of the actuator within a first range of motion represented by double arrow 20. Seat 22 may be attached to part 16 such that seat 22 follows the movements of first part 16 in forward and backward directions also indicated by double arrow 20.

As another example illustrated in FIG. 5b, wireless signals may be transmitted to a rearview mirror actuator having a motor 24. The wireless signals may cause a first internally-threaded part 26 of the actuator to rotate and thereby move relative to an externally-threaded second part 28 of the actuator within a first range of motion represented by double arcuate arrow 30. Rearview mirror 32 may be attached to part 26 such that mirror 32 follows the movements of first part 26 in clockwise and counterclockwise directions also indicated by double arrow 30.

In a next step 504, after the vehicle is in motion, the first part is provided with a limited range of motion relative to the second part, the providing of the limited range of motion being implemented via software, the limited range of motion being less than the first range of motion. In the example illustrated in FIG. 5b, first part 16 may be provided via software with a limited range of motion indicated by double arrow 34 relative to second part 18. The limited range of motion 34 is less than the first range of motion 20. In a specific embodiment, limited range of motion 34 may span approximately between one and three inches.

In the other example illustrated in FIG. 5b, first part 26 may be provided via software with a limited range of motion indicated by double arrow 36 relative to second part 28. The limited range of motion 36 is less than the first range of motion 30. In a specific embodiment, limited range of motion 36 may span approximately between 0.25 inch and one inch.

In one embodiment, the limited range of actuator motion is implemented via software a predetermined period of time after an engine of the vehicle is started. In a specific embodiment, the predetermined period of time is approximately between thirty seconds and three minutes. In another embodiment, the limited range of actuator motion is implemented via software within about two seconds after the vehicle is put into motion, i.e., after the wheels of the vehicle begin to rotate. Regardless of when the limited range of actuator motion is put into effect, the limited range of motion may be removed after an engine of the vehicle is turned off and restarted.

It is contemplated by the invention that the limited range of actuator motion is implemented via software. However, it is within the scope of the invention for the range of actuator motion to be limited via mechanical means instead, or as a redundant safety measure.

Figure 6:
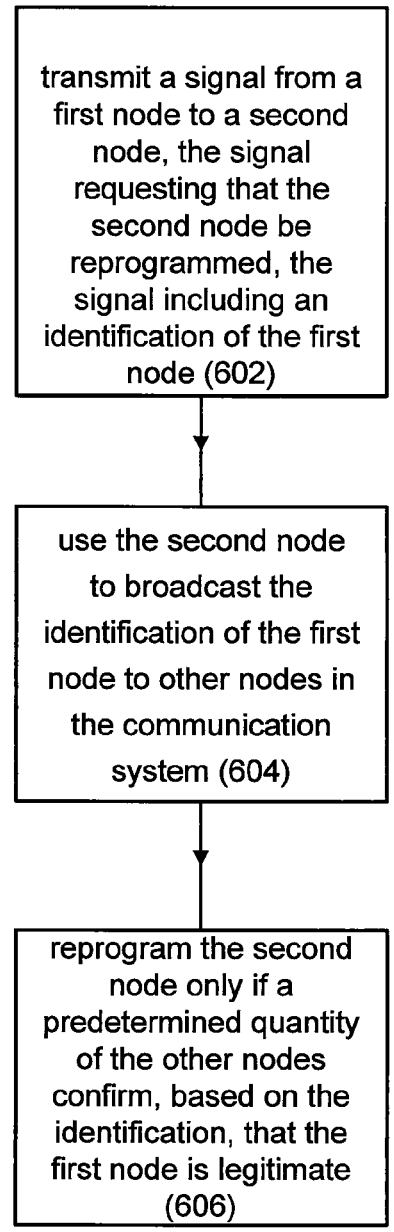
FIG. 6 is a flow chart illustrating a method for reprogramming a node of a wireless communication system according to one embodiment of the present invention.

One embodiment of a method 600 for reprogramming a node of a communication system is illustrated in FIG. 6. In a first step 602, a signal is transmitted from a first node to a second node, the signal requesting that the second node be reprogrammed, the signal including an identification of the first node. For example, an update for the programming of a wireless node may be available, and a node within a service garage may transmit a request to the target node that the target node be reprogrammed. The request may include an identification of the node in the service garage that is making the request. Alternatively, a third-party node in a nearby vehicle may be operated by a person intending harm and/or mischief towards the target node in the inventive vehicle. The illegitimate third-party node may attempt to emulate the legitimate node in the service garage and may transmit a similar request for reprogramming to the target node. The illegitimate reprogramming request may include an identification, which may be counterfeit, of the node making the reprogramming request In a next step 604, the second node is used to broadcast the identification of the first node to other nodes in the communication system. That is, the target node that receives the reprogramming request may broadcast the node identification received with the request to other nodes within the inventive vehicle. The node identification may be broadcast either wirelessly or via electrical conductors.

In a final step 606, the second node is reprogrammed only if a predetermined quantity of the other nodes confirm, based on the identification, that the first node is legitimate. For example, as a requirement for the target node to allow itself to be reprogrammed, a certain number of the total number of nodes in the network that received the node identification may need to respond to the target node, certifying that the identified node has been interfaced with in the past, and that the identified node is known to be non-malicious. Alternatively, a certain percentage of the total number of nodes in the network that received the node identification may need to respond to the target node with their certifications of the identified node.

While broadcasting the identification of the requesting node, the target node may include an identification of the target node as well. Other nodes may maintain a record of the identifications of the requesting nodes and the target nodes. In the event that the above-described efforts fail, and the target node does in fact become maliciously reprogrammed, the other nodes may make use of the identification records in order to mitigate the damages that may result from the malicious reprogramming. Particularly, if another network node observes that a node that was previously or recently a target of a reprogramming has since begun to operate in an unexpected manner, or has transmitted unusual signals, then the target node as well as the node that requested the reprogramming may be placed on a "blacklist" such that all of the other network nodes will ignore future signals from the target node and/or the requesting node.

In one embodiment, a target node may check to see whether a requesting node is on such a blacklist before broadcasting the requesting node's identification. If the target node does find the identification of the requesting node on the blacklist, then the target node may ignore the request and may refrain from broadcasting the requesting node's identification, thereby conserving processing effort and network bandwidth.

Service personnel may be given access to the blacklist such that they can take appropriate actions. For example, service personnel may investigate and take nodes off of the blacklist and/or reprogram nodes that have been maliciously reprogrammed.

The present invention has been described herein primarily in reference to wireless node networks in an automobile. However, it is to be understood that the invention may be equally applicable to any type of vehicle, including marine vehicles and airplanes. Moreover, many embodiments of the inventions are not limited to wireless networks, but rather may be applicable to wired or partially-wired networks.

Adjacent vehicles have been described herein as communicating with each other and coming into agreement with regard to respective frequency channels and transmission power levels. However, in another embodiment, there is a master node assigned in each communication, and the master node assigns each of the other nodes (slave nodes) in the communication their respective channel and power level. Which node is assigned to be the master may be based on the number of other nodes that the node is able to communicate with. That is, the node that is able to communicate with the greatest number of other nodes may be assigned as the master node. Alternatively, the assignment of the master node may be made arbitrarily or in a predetermined hierarchical scheme, such as based on the highest identification number. Using a master node may be more efficient than allowing the nodes to negotiate on a more equal basis.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A method for providing wireless communications between nodes of a vehicle, the method comprising the steps of:
    providing a plurality of frequency channels on which a plurality of nodes of a first vehicle may wirelessly communicate; and
    the first vehicle wirelessly communicates with a second vehicle adjacent to the first vehicle, the communicating including assigning:
    a first frequency channel of the frequency channels to the first vehicle for intra-vehicle transmissions within the first vehicle; and
    a second frequency channel of the frequency channels to the second vehicle for intra-vehicle transmissions within the second vehicle such that the first vehicle is prohibited from using the second frequency channel and the second vehicle is prohibited from using the first frequency channel;
    a first power level to the first vehicle for intra-vehicle transmissions within the first vehicle; and
    a second power level to the second vehicle for intra-vehicle transmissions within the second vehicle.

2. The method of claim 1 comprising the further step of wirelessly communicating with a third vehicle and a fourth vehicle, each of the four vehicles being adjacent to each of the other three vehicles, the communicating with the third and fourth vehicles including assigning:
    a third frequency channel of the frequency channels to the third vehicle for intra-vehicle transmissions within the third vehicle; and
    a fourth frequency channel of the frequency channels to the fourth vehicle for intra-vehicle transmissions within the fourth vehicle.

3. The method of claim 2 comprising the further step of wirelessly communicating with a fifth vehicle, the fifth vehicle being adjacent to each of the first vehicle and the second vehicle, the communicating including assigning one of the third frequency channel and the fourth frequency channel to the fifth vehicle for intra-vehicle transmissions within the fifth vehicle.

4. The method of claim 1 wherein the first vehicle and the second vehicle are on adjacent floors of a parking garage.

5. The method of claim 1 comprising the further step of wirelessly communicating with a third vehicle, the first and third vehicles being adjacent to each other, the communicating with the third vehicle including assigning respective periods of times to the first vehicle and to the third vehicle for using the first frequency channel for intra-vehicle transmissions within the first and third vehicles.

6. The method of claim 5 wherein the first and third vehicles are adjacently disposed relative to each other on adjacent levels of a parking garage.

7. A method for providing wireless communications between nodes of a vehicle, the method comprising the steps of:
conducting wireless communication between a first vehicle and a second vehicle, the second vehicle being adjacent to the first vehicle;
determining whether two different frequency channels are available for intra-vehicle transmissions within the first vehicle and within the second vehicle, wherein:
if it is determined that two different frequency channels are available for intra-vehicle transmissions within the first vehicle and within the second vehicle, then the method comprising the further step of assigning:
a first frequency channel of the frequency channels to the first vehicle for intra-vehicle transmissions within the first vehicle; and
a second frequency channel of the frequency channels to the second vehicle for intra-vehicle transmissions within the second vehicle such that the first vehicle is prohibited from using the second frequency channel and the second vehicle is prohibited from using the first frequency channel, else,
if it is determined that only one frequency channel is available for both intra-vehicle transmissions within the first vehicle and intra-vehicle transmissions within the second vehicle, then the method comprising the further step of assigning a time-share schedule to the first vehicle for use of the one frequency channel for intra-vehicle transmissions within the first vehicle and to the second vehicle for use of the one frequency channel for intra-vehicle transmissions within the second vehicle.

8. The method of claim 7 comprising the further step of wirelessly communicating with a third vehicle and a fourth vehicle, each of the four vehicles being adjacent to each of the other three vehicles, the communicating with the third and fourth vehicles including assigning:
a third frequency channel of the frequency channels to the third vehicle for intra-vehicle transmissions within the third vehicle; and
a fourth frequency channel of the frequency channels to the fourth vehicle for intra-vehicle transmissions within the fourth vehicle.

9. The method of claim 8 comprising the further step of wirelessly communicating with a fifth vehicle, the fifth vehicle being adjacent to each of the first vehicle and the second vehicle, the communicating including assigning one of the third frequency channel and the fourth frequency channel to the fifth vehicle for intra-vehicle transmissions within the fifth vehicle.

10. The method of claim 7 wherein the communicating includes assigning:
a first power level to the first vehicle for intra-vehicle transmissions within the first vehicle; and
a second power level to the second vehicle for intra-vehicle transmissions within the second vehicle.

11. The method of claim 7 wherein the first vehicle and the second vehicle are on adjacent floors of a parking garage.

12. The method of claim 7 comprising the further step of wirelessly communicating with a third vehicle, the first and third vehicles being adjacent to each other, the communicating with the third vehicle including assigning respective periods of times to the first vehicle and to the third vehicle for using the first frequency channel for intra-vehicle transmissions within the first and third vehicles, wherein the first and third vehicles are adjacently disposed relative to each other on adjacent levels of a parking garage.

13. The method of claim 7 wherein the time-share schedule comprises a first plurality of time slots in which the first vehicle may use the one frequency channel for intra-vehicle transmissions within the first vehicle and a second plurality of time slots in which the second vehicle may use the one frequency channel for intra-vehicle transmissions within the second vehicle, the first time slots and the second time slots being mutually exclusive.

14. A method for providing wireless communications between nodes of a vehicle, the method comprising the steps of:
providing a plurality of frequency channels on which a plurality of nodes of a first vehicle may wirelessly communicate; and
the first vehicle wirelessly communicates with a second vehicle adjacent to the first vehicle and with a third vehicle adjacent to the second vehicle and nonadjacent to the first vehicle, the communicating including assigning:
a first frequency channel of the frequency channels to: the first vehicle for intra-vehicle transmissions within the first vehicle; and the third vehicle for intra-vehicle transmissions within the third vehicle;
a second frequency channel of the frequency channels to the second vehicle for intra-vehicle transmissions within the second vehicle such that the first and third vehicles are prohibited from using the second frequency channel and the second vehicle is prohibited from using the first frequency channel;
a first maximum power level to the first vehicle for intra-vehicle transmissions on the first frequency channel within the first vehicle; and
a second maximum power level to the third vehicle for intra-vehicle transmissions on the first frequency channel within the third vehicle.

15. The method of claim 14 wherein the first maximum power level is dependent upon a number of vehicles adjacent to the first vehicle, and the second maximum power level is dependent upon a number of vehicles adjacent to the third vehicle.

16. The method of claim 14, wherein the first maximum power level is dependent upon a distance between the first vehicle and a vehicle adjacent to the first vehicle, and the second maximum power level is dependent upon a distance between the third vehicle and a vehicle adjacent to the third vehicle.

17. The method of claim 14 wherein the first maximum power level and the second maximum power level are dependent upon a magnitude of a difference between a frequency of the first frequency channel and a frequency of the second frequency channel.

18. The method of claim 14 comprising the further step of wirelessly communicating with a fourth vehicle, the first and fourth vehicles being adjacent to each other, the communicating with the fourth vehicle including assigning respective periods of times to the first vehicle and to the fourth vehicle for using the first frequency channel for intra-vehicle transmissions within the first and fourth vehicles.

19. The method of claim 14 comprising the further step of wirelessly communicating with a fourth vehicle adjacent to the first vehicle and nonadjacent to the second vehicle, the communicating including assigning:

the second of the frequency channels to the fourth vehicle for intra-vehicle transmissions within the fourth vehicle such that the fourth vehicle is prohibited from using the first frequency channel;

a third maximum power level to the second vehicle for intra-vehicle transmissions on the second frequency channel within the second vehicle; and a fourth maximum power level to the fourth vehicle for intra-vehicle transmissions on the second frequency channel within the fourth vehicle.

* * * * *